United States Patent
Maibom

(10) Patent No.: US 6,729,668 B2
(45) Date of Patent: May 4, 2004

(54) DEVICE FOR DIVIDING THE STORAGE SPACE BEHIND A SEAT IN A VEHICLE, ESPECIALLY A PRIVATE CAR

(75) Inventor: Mark Maibom, Bocholt (DE)

(73) Assignee: Johann Borgers GmbH & Co. KG, Bocholt (DE)

( * ) Notice: Subject to any disclaimer, the term of this patent is extended or adjusted under 35 U.S.C. 154(b) by 0 days.

(21) Appl. No.: 10/312,799

(22) PCT Filed: Jul. 4, 2001

(86) PCT No.: PCT/EP01/07614

§ 371 (c)(1),
(2), (4) Date: Dec. 31, 2002

(87) PCT Pub. No.: WO02/09969

PCT Pub. Date: Feb. 7, 2002

(65) Prior Publication Data

US 2003/0122397 A1 Jul. 3, 2003

(30) Foreign Application Priority Data

Jul. 27, 2000 (DE) .......................................... 100 36 544

(51) Int. Cl.⁷ ............................. B60R 5/04; B60N 2/36
(52) U.S. Cl. ..................... 296/24.1; 296/37.16; 296/69; 160/226
(58) Field of Search .............................. 296/37.8, 37.16, 296/24.1, 63, 65.01, 65.16, 69; 160/226, 227; 297/334, 335, 336

(56) References Cited

U.S. PATENT DOCUMENTS

| 2,173,569 A | * | 9/1939 | Troendle | 297/146 |
|---|---|---|---|---|
| 3,387,882 A | * | 6/1968 | Mycue | 297/163 |
| 4,443,034 A | * | 4/1984 | Beggs | 296/65.17 |
| 5,039,155 A | * | 8/1991 | Suman et al. | 296/65.03 |
| 5,492,257 A | * | 2/1996 | Demick | 224/275 |
| 5,931,527 A | * | 8/1999 | D'Onofrio et al. | 297/146 |
| 5,967,054 A | * | 10/1999 | Rosenfeld | 108/44 |
| 5,975,612 A | * | 11/1999 | Macey et al. | 296/66 |
| 6,113,172 A | * | 9/2000 | Chaloult et al. | 296/26.08 |
| 6,290,277 B1 | * | 9/2001 | Spykerman et al. | 296/24.1 |

FOREIGN PATENT DOCUMENTS

| DE | 4202103 | 8/1992 |
|---|---|---|
| EP | 0927663 | 7/1999 |
| FR | 2785243 | 5/2000 |
| WO | 0140023 | 6/2001 |

OTHER PUBLICATIONS

Die A–Klasse, Daimler–Benz, VP/KW 6701·1403·00–00/ 000897, 5 pages.

* cited by examiner

*Primary Examiner*—D. Glenn Dayoan
*Assistant Examiner*—Patricia L Engle
(74) *Attorney, Agent, or Firm*—Friedrich Kueffner

(57) ABSTRACT

The invention relates to a device for dividing (41, 42) the storage space behind a seat, comprising a storage floor (21) having a horizontal hinge (22). The storage floor (21) can be unfolded (46) or folded up in relation to the vehicle floor. Said hinge (22) enables the storage floor (21) to alternate between being in a storage position and a non-storage position. The invention aims to facilitate structure and handling. In order to achieve this, the storage floor (21) is fixed to the rear (19) of the seat by means of the hinge (22), forming a unit comprising the storage floor (21) and seat, which can be pre-assembled. In the non-storage position, the storage floor (21) folds onto the rear side (19) of the back of the seat (12) and is fixed thereto by a retaining means (30). In the storage position (21.2), the storage floor (21) juts out of the back of the seat (12) and is held in position by means of supporting surfaces (28). Said storage floor forms an upper storage floor (25) located above the vehicle floor.

13 Claims, 4 Drawing Sheets

DEVICE FOR DIVIDING THE STORAGE SPACE BEHIND A SEAT IN A VEHICLE, ESPECIALLY A PRIVATE CAR

BACKGROUND OF THE INVENTION

The invention pertains to a device for dividing the storage space behind a seat in a vehicle. The interior space of a vehicle is defined both by its volume and also by the extent to which that volume can actually be used. The volume itself results from the configuration of the interior space, which is determined by the various interior components such as the seats. The storage space behind the backrests of the seats is what primarily determines the usefulness of that volume.

In the known device of the type in question, the floor of the storage space consists of a cover panel, which normally seals off a recessed well in the floor of the vehicle (company brochure: Daimler-Benz AG, VP/KW 6701·1403·00-00/ 00897, "The Mercedes-Benz A Class", pp. 36 and 37). The visible side of this cover panel is lined with carpeting, which continues forward along the floor of the vehicle underneath the seat. As a result, a so-called "film hinge" is created by the carpet at the transition point underneath the seat between the cover panel and the floor of the vehicle. When the cover panel is flipped up while the seat is in its normal position, the cover panel strikes the backrest of the seat. Although it is then possible to use the lower storage space in the well underneath the cover panel to hold cargo, the panel is not secured in its flipped-up position. It is therefore necessary to tie the flipped-up cover panel in position with a cord, for example. To obtain a large storage space, both the seat part and the backrest must be repositioned twice from their normal positions. It is impossible to move the cover panel into a position beyond its flipped-up position, however, because this would put too much stress on the hinge formed by the carpet. In any case, the interior of the vehicle becomes highly unattractive when the cover panel is flipped up, for which reason the flipped-up position is used only when necessary, never under normal conditions. Under normal conditions, therefore, one makes do with the partial space above the cover panel covering the recessed well. The well is usually used only to store important tools for the vehicle such as tools for changing flat tires, which are gladly kept out of sight by the cover panel over the well.

In a modified device, in which the various sub-spaces are not combined into a single, large storage space when the cover panel is in its non-storage position (DE 198 02 077 A1), an insert is used to move the cover panel from its low, normal level to a higher level. The idea of this insert is to bring the floor of the storage space up to a level which matches the loading edge of the trunk opening of the vehicle. This device is expensive and occupies too much space. The insert is a product which must be manufactured separately, and it also occupies a great deal of space in the vehicle when not being used. If it is stored outside the vehicle, it is not always available when needed. The work involved in adjusting the cover panel is also awkward, because the cover panel must first be removed from its normal position; then the insert must be put in place; and finally the cover panel must then be laid on top of the insert. Disassembly is equally cumbersome.

It is known that the floor of the trunk space of a motor vehicle can be covered by a protective mat (DE 198 20 517 A1). The protective mat consists of several folding sections and side parts, which means that the mat can be folded onto itself several times when not in use and stored in this folded-up state behind the backrest. The folded-up mat is secured in its storage location by a retaining device attached to the mat. That is, the protective mat has a folding retaining part, by means of which the mat can be buttoned to and unbuttoned from the rear surface of the backrest of the vehicle. The protective mat cannot be used to divide the storage space into sub-spaces.

SUMMARY OF THE INVENTION

The invention is based on the task of developing a reliable device for dividing the storage space behind a seat, which is attractive when in its storage position and also in its non-storage position, which can be moved conveniently between these two positions, and which can be held reliably in place in both. This is achieved by the features of the present invention, to which the following special meaning attaches:

In the invention, the seat and the cover panel form a structural unit. This structural unit is produced as a complete system by a supplier. The buyer is required merely to perform the work required to install the seat in the interior of the vehicle. In the flipped-up position, the cover panel lies against the backrest, where it is held in place by retaining means. The cover panel serves in this case, first, as a safety component in the event of a crash: it reinforces the backrest. Especially when damping means are integrated into the cover panel, the cover panel also acts as an acoustic component when in the flipped-up position, which considerably reduces the amount of unpleasant noise in the interior of the vehicle when it is operating. The cover panel can be upholstered on the side opposite that which supports the cargo; when the panel is in the flipped-up position, this upholstered side thus completes the upholstery of the backrest. This improves the damping effect and also increases the degree to which the danger of injury in a crash is reduced. The backrest supports the cover panel after it has been flipped up, and the cover panel forms the rear surface of the backrest of the seat. Regardless of whether the cover panel is in this up position or in its down position, in which it supports the cargo, the object according to the invention always presents a good optical appearance. When the cover panel is moved between the up and the down position, only the panel itself is moved, whereas the seat can usually remain stationary.

Additional measures and advantages of the invention can be derived from the subclaims, from the following description, and from the drawings. The drawings present the invention in the form of schematic diagrams, which illustrate several exemplary embodiments and positions:

DETAILED DESCRIPTION OF THE INVENTION

Figure 1:
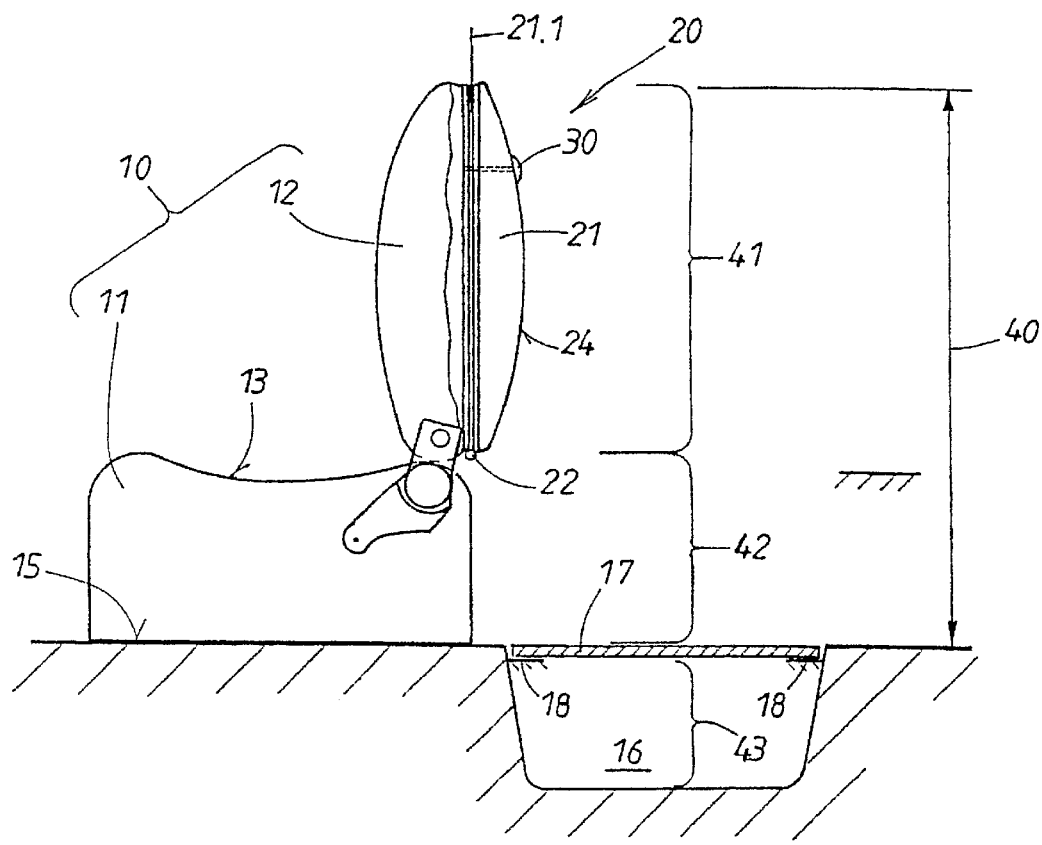
FIG. 1 shows a side view of a vehicle with the seat according to the invention, the seat being designed to form a single structural unit with the cover panel, shown in a first position.

A vehicle floor 15 has a seat 10 in a defined position; the seat is divided into a flat seat part 11 and a backrest 12. These parts 11, 12 are provided with an upholstered, resilient seating surface 13 on the seat part and an upholstered support surface 14 on the backrest 12. A well 16 can be integrated into the floor of the vehicle, which can be closed off when desired by a cover 17. For this purpose, shoulders 18 are provided around the inside of the well.

A cover panel 21 is attached by a hinge 22 to the rear of the seat 10. In this case, the cover panel 21 is hinged by the hinge 22 to the backrest 12. The hinge 22 determines an essentially horizontal folding axis 23, as illustrated by the broken line in FIG. 5. In this way, the flat seating part 11, the backrest 12, and the cover panel 21 connected to the backrest form a single structural unit 20, which can be preassembled as a complete unit. The hinge 22 is located in the lower area of the backrest 12.

Figure 2:
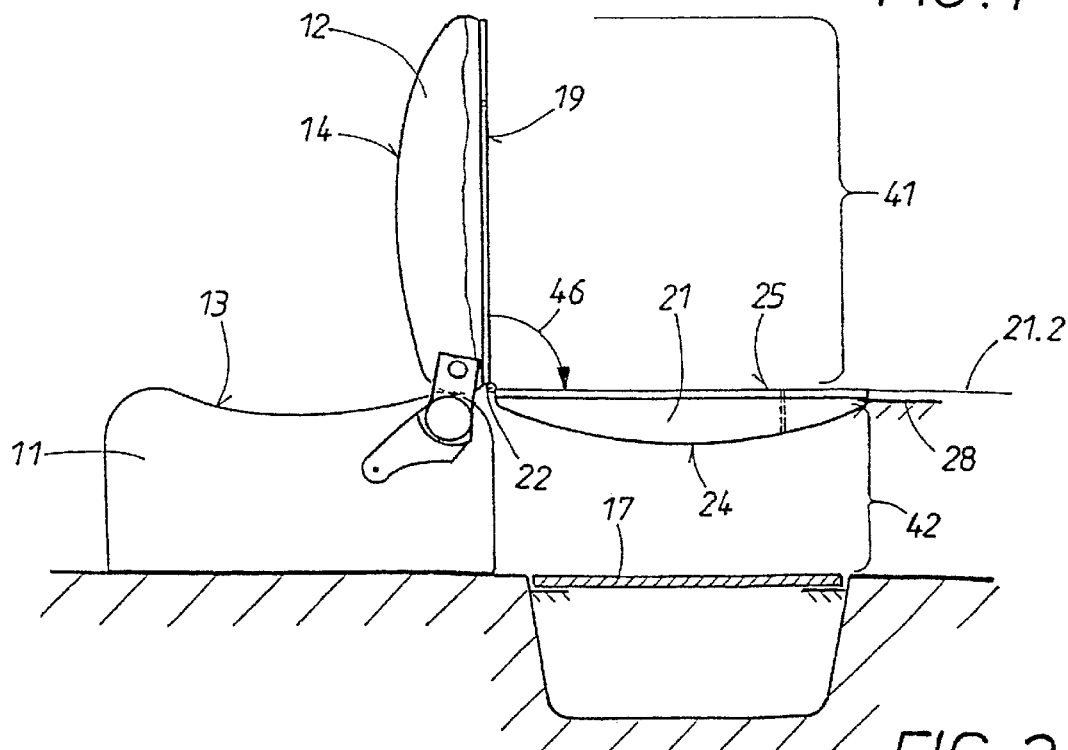
FIGS. 2, 3, and 4 show views of the structural unit shown in FIG. 1 after the cover panel and the backrest of the seat have been moved into three other positions.

The cover panel 21 usually occupies the position shown in FIG. 1, in which its utility surface 25, shown in FIG. 2, rests flush against the rear surface 19 of the backrest 12. This folded-up position is characterized by the auxiliary line 21.1 in FIG. 1 and is to be referred to as the "up" position of the cover panel 21. Retaining means 30 are provided in the upper area of the folded-together components 12, 21. Opposite the utility surface 25, the cover panel 21 has a decorative surface 24, which is visible in the up position of FIG. 1. This decorative surface 24 is adapted in terms of shape and structure to the spaces and surfaces present in the area of the seat, i.e., to the body of the car in the storage area 40. In addition, the backrest 12 also has the sound-damping and sound-suppressing function already indicated.

By disconnecting the retaining means 30, the cover panel 21 can be swung on the hinge 22 around an angle 46 into the down position shown in FIG. 2, which is illustrated by the corresponding auxiliary line 21.2. The storage spade 40 extending as far as the upper edge of the backrest 12 is thus divided into two sub-spaces 41, 42. With respect to the cover 17, functioning as the lower cover panel, the cover panel 21 assumes a superior position and thus becomes the "upper cover panel" with respect to 17. In its outward-projecting position shown in FIG. 2, the upper cover panel 21 is supported at its free edge by a shoulder 28 in the interior of the car body.

Figure 3:
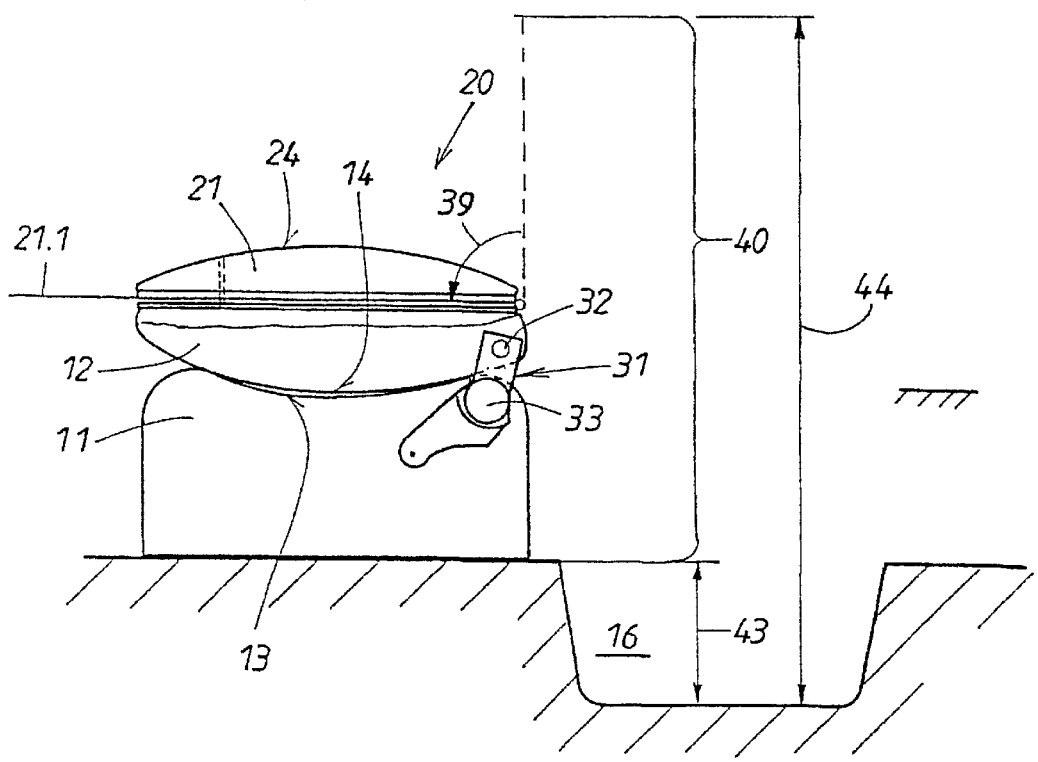

As can be seen in FIG. 3, there is a joint fitting 31 between the flat seating part 11 and the backrest 12. This defines a joint axis 32. The backrest 12 can be tilted into various positions by means of a gear mechanism (not shown) included in the joint fitting 31. To actuate this mechanism, a handle 33, for example, which can be seen in FIG. 3, is used. It is obvious that motorized actuating means could also be used for this purpose. By means of this handle 33, the assembly consisting of the backrest 21 and the cover panel 21, currently in the up position, can be swung around an angle 39 into a horizontal position, shown in FIG. 3, where the support surface 14 of 12 on the one hand and the seating surface 13 of 11 on the other are in contact with each other. This assembly 21, 12 can here assume an essentially horizontal position.

In FIG. 3, furthermore, the cover 17 on the well 16 has been removed. As a result, a single large storage space, the size of which has been increased by the depth 43 of the well, is obtained. At least the height 44 of FIG. 3 is available to receive cargo. The cargo can even extend into the space above the flat decorative surface 24 of the cover panel 21.

Figure 4:
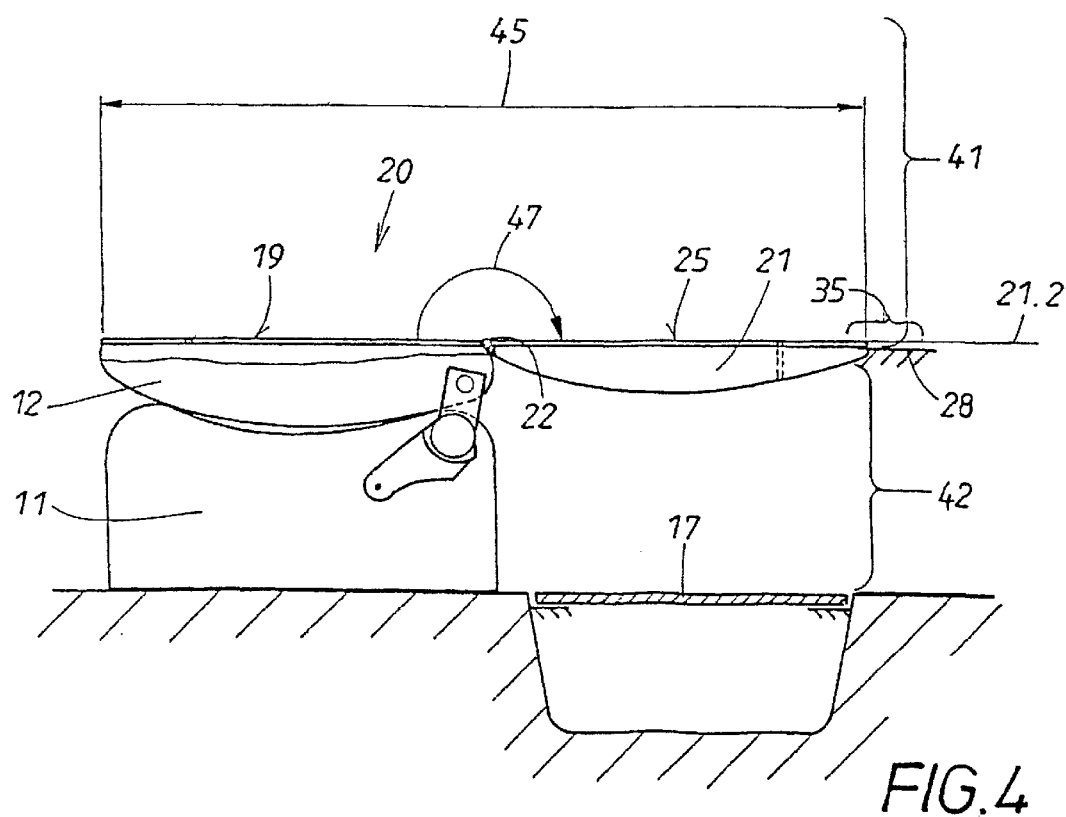

Proceeding from FIG. 3, it is possible to move the structural unit 20 according to the invention into its additional position, shown in FIG. 4. For this purpose, the cover panel 21 is swung on its hinge 22 away from the backrest 12 around an angle 47 which is twice that shown in FIG. 2. The storage space 40 is again divided into two sub-spaces 41, 42, already seen in FIG. 2, provided that the cover 17 is still in the position shown in FIG. 2. Otherwise, the lower level of the storage space is increased by the depth 43 of the well. The utility surface 25 of the cover panel 21 is essentially on the same plane as the rear surface 19 of the backrest 12. Thus a single, large, continuous cargo surface 45 is obtained. This "down" storage position 21.2 of the upper cover panel 21 can, as in FIG. 2, be held in place by latches 35 (not shown) in the interior of the vehicle. These latches 35 and the complementary latching means are located, for example, at the rear edge of the cover panel 21 and on the shoulder 28, which is a permanent part of the vehicle.

The hinge 22 in the first exemplary embodiment is located in the transition area between the backrest 12 and the seat part 11. This also applies to the second exemplary embodiment according to FIGS. 7 and 8, which, however, is modified in the following way. In this structural unit 20', the upper cover panel 21' is divided into two sub-panels 26, 27, which are connected to each other by an auxiliary hinge 29. FIG. 7 again shows the down position 21.2'. Here the two sub-panels 26, 27 are stretched out. In this case, too, the backrest 12 is folded down, as also in FIG. 4, for which reason its rear surface 19 again forms a single, large, continuous cargo surface 45 in the area of the upper level 41 of the storage space. Underneath the upper cover panel, the corresponding lower storage level 42 is also available, where again, by installing or removing the cover 17 present there, the cargo space can be increased if desired by the depth 43 of the well.

Figure 7:
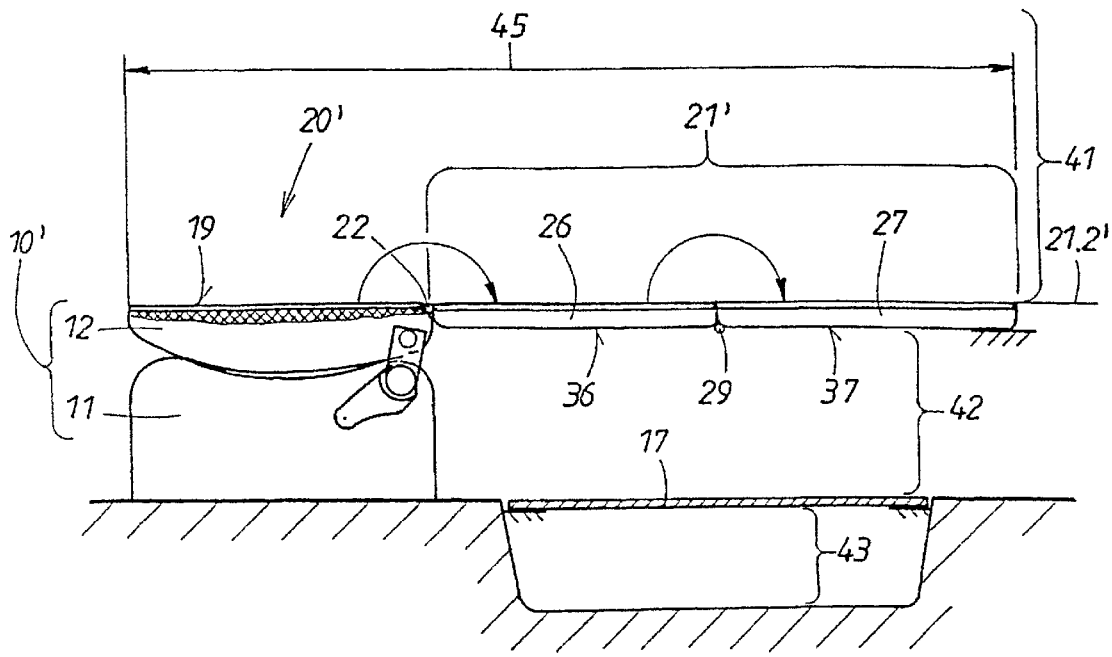
FIG. 7 shows a view similar to that of FIG. 1 of a second embodiment of the structural unit according to the invention in a first position.
Figure 8:
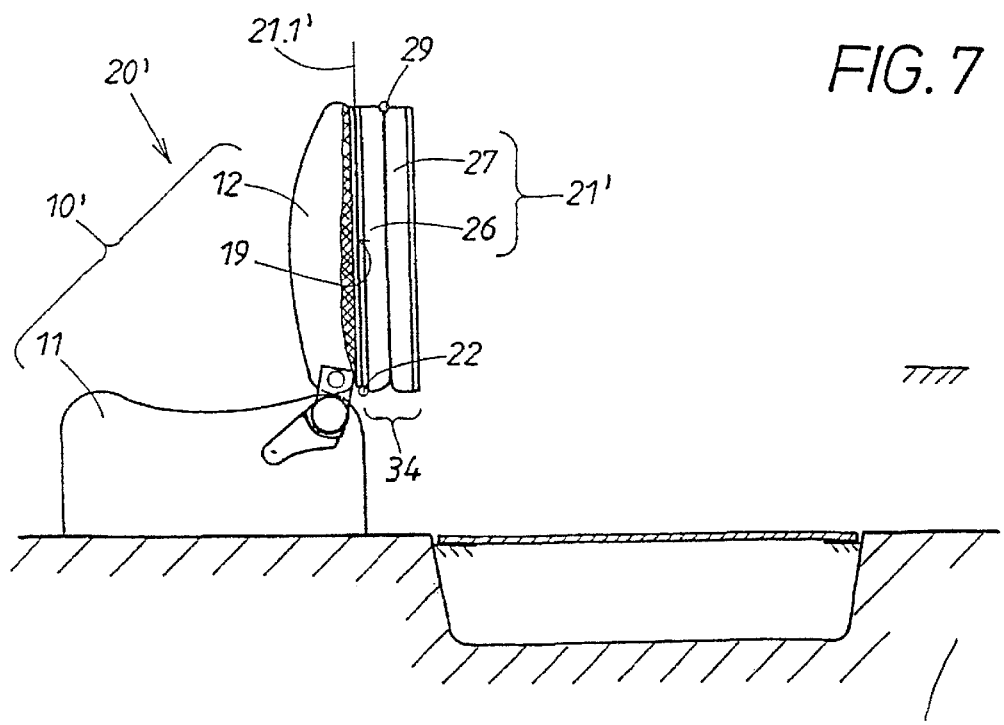
FIG. 8 shows the structural unit according to FIG. 7 after the components have been moved into a second position.

FIG. 8 shows the same structural unit 20' with the backrest 12 in the normal upright position. In addition, the two-part upper cover panel 21' is in this case moved into its special up position 21.1'. In this position, the utility surface of the forward sub-panel 26 shown in FIG. 7 is in contact with the rear surface 19 of the backrest 12, and the rear sub-panel 27 is in contact with the forward sub-panel 26. The bottom surfaces 36, 37 of these two sub-panels 26, 27, i.e., the parts which are facing downward in FIG. 7, are resting against each other in FIG. 8. The auxiliary hinge 29 has been moved from its stretched-out 180° position of FIG. 7 into the folded, 0° position of FIG. 8. A accordion-like fold is therefore present. A compact panel package 34 behind the rear surface 19 of the backrest 12 is thus obtained in the "up" position of FIG. 8.

It is obvious that the upper cover panel 21' could also be divided into more than two sub-panels 26, 27. Instead of the division of the upper cover panel 21' in the longitudinal direction of the vehicle, it would also be possible to divide it in the transverse direction of the vehicle. Each panel section could be designed to fold with respect to the backrest 12 independently of the others. Insofar as, in this case, the seat 10' to which upper cover panel 21' is attached is already divided longitudinally into sections, the upper cover panel will also be divided longitudinally in a manner corresponding to the division of the seat. It would also be possible for the upper cover panel 21 or 21' not to extend over the entire height of the backrest 12 but rather over only a part of it, so that several auxiliary panels could be arranged one above each other. Each of these could then consist in turn of several sub-parts, which could be moved in their entirety or in stages from the up position 20.1' to the down position 20.2'. In this way, the single large storage space 40 can be divided into more than two sub-spaces.

Figure 5:
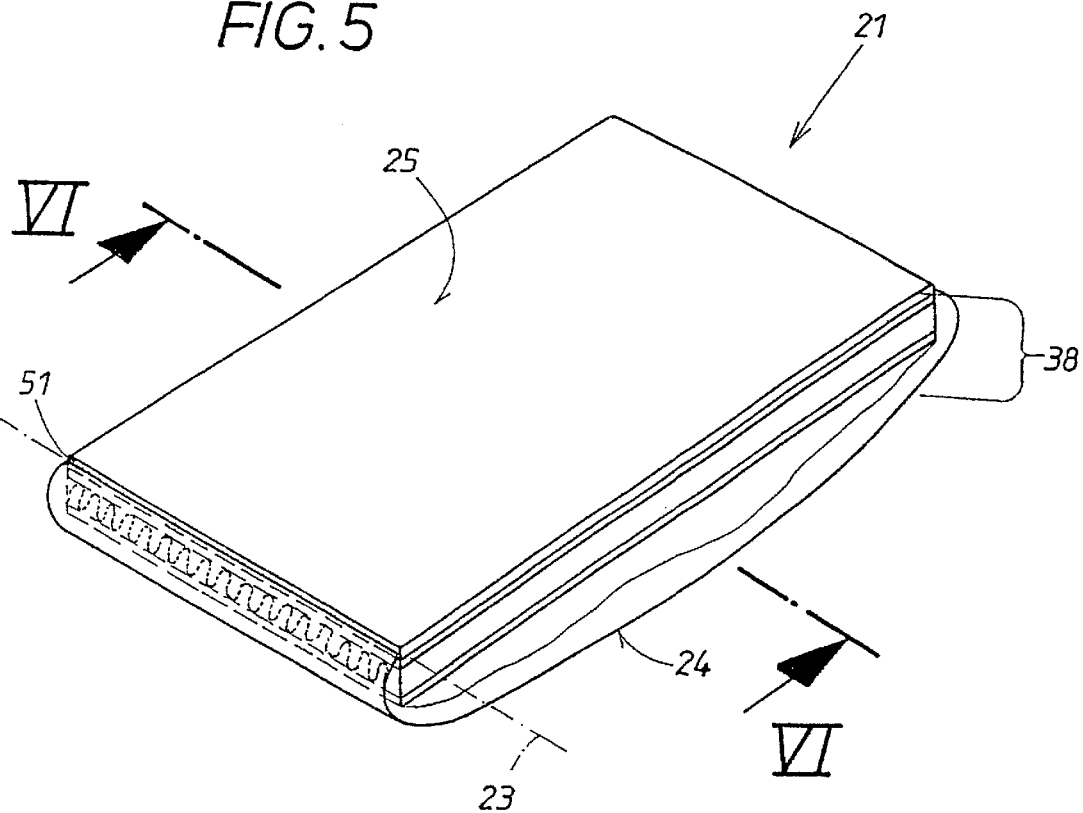
FIG. 5 shows a perspective view, partially cut away, of a cover panel belonging to the structural unit of FIG. 1.
Figure 6:
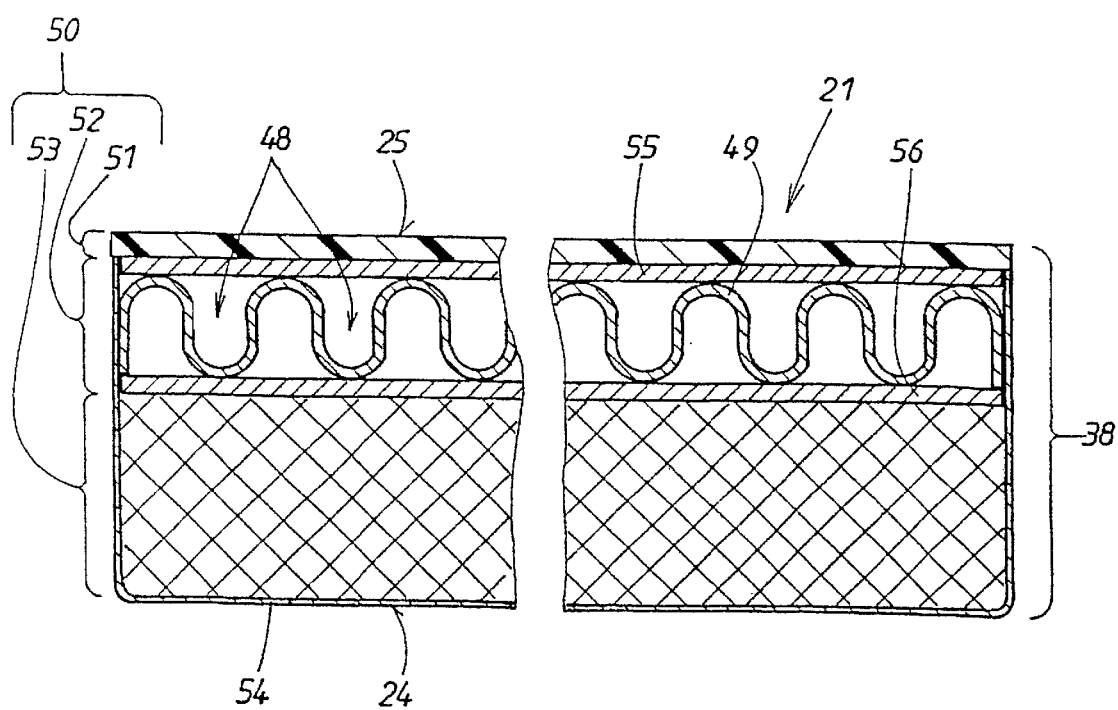
FIG. 6 shows a schematic cross section, enlarged in comparison with FIG. 5 and partially cut away, through the cover panel along line VI—VI of FIG. 5.

FIGS. 5 and 6 show an advantageous design for this type of upper cover panel 21. First, in correspondence with the difference in their functions, the utility surface 25 will be designed differently from the other, decorative surface 24, i.e., the surface which is visible when the panel is in the up position 20.1. The utility surface 25 will be made especially strong to withstand the mechanical stresses exerted on it by the cargo. The decorative surface 24, however, will be designed to match the style of its surroundings. For the previously mentioned good damping function of the upper cover panel 21, it is recommended that a multi-layer design be used, which is illustrated with particular clarity in FIG. 6. A laminate 50 made up of several layers 51–54 is present here. The uppermost layer 51 represents the utility surface 25 and consists of, for example, a scratch-resistant material. Then comes a support layer 52, which is designed to provide dimensional stability. This is followed by an upholstery layer 53 of foam, etc., which is followed finally by a decorative layer 54. This decorative layer 54 can advantageously be wrapped around the edges to conceal the lateral edges 38 of the upper cover panel 21 and extend all the way to the uppermost layer 51 forming the utility surface 25.

To increase the effectiveness of the damping, both the upholstery layer 53 and also the support layer 52 can themselves be divided into several sub-layers. Knowledge of the principles by which acoustic elements are designed will be helpful here. Various functional parts which must be accessible from the utility surface 25 can be integrated into the uppermost layer 51. Such functional parts could include friction strips for holding the cargo, tie-down rings for securing the cargo, and handles for folding the upper cover panel up and down. In the latter case, the folding is done by hand. It is obvious that motors could also take over the job of swinging the upper cover panel 21 around the small angle 46 of FIG. 2 or the large angle 47 of FIG. 4. In a similar manner, as previously mentioned, it would also be possible to motorize the job of adjusting the angle of the backrest 12 or of the assembly consisting of the backrest 12 and the upper cover panel 21 according to FIG. 3 around the tilt angle 38, which can be seen in FIG. 3.

For the sake of reducing weight and increasing the dimensional stability, it is recommended that the support layer 52 be provided with a honeycomb structure 48, for example, as can be derived from FIG. 6. In the present case, it is assumed that the intermediate layer 49 is corrugated and is sandwiched between two flat panels 55, 56. The upper panel 55 carries the uppermost layer on which the cargo rests, whereas the lower panel 56 is used to support the layer of upholstery 53.

List of Reference Numbers

| | |
|---|---|
| 10 | seat (FIGS. 1–4) |
| 10' | seat (FIGS. 7, 8) |
| 11 | flat seat part of 10, 10' |
| 12 | backrest of 10, 10' |
| 13 | seating surface of 11 |
| 14 | support surface of 12 |
| 15 | floor of vehicle |
| 16 | well |
| 17 | cover of 16 |
| 18 | interior shoulder in 16 for 17 |
| 19 | rear surface of 12 |
| 20 | structural unit consisting of 10, 21 (FIGS. 1–4) |

-continued

List of Reference Numbers

| | |
|---|---|
| 20' | structural unit consisting of 10', 21' (FIGS. 7, 8) |
| 21 | upper cover panel (FIGS. 1–4) |
| 21' | upper cover panel (FIGS. 7, 8) |
| 21.1 | up position of 21 on 12 (FIGS. 1, 3) |
| 21.2 | down position of 21 with respect to 12 (FIGS. 2, 4) |
| 21.1' | down position of 21' with respect to 12 (FIG. 7) |
| 21.2' | down position of 21' with respect to 12 (FIG. 7) |
| 22 | hinge between 12 and 21, and between 12 and 21' |
| 23 | horizontal fold axis of 22 for 21 (FIG. 5) |
| 24 | decorative surface of 21 |
| 25 | utility surface of 21 |
| 26 | forward sub-panel of 21' (FIG. 7) |
| 27 | rear sub-panel of 21' (FIG. 7) |
| 28 | support shoulder for 21 (FIG. 2) |
| 29 | auxiliary hinge between 26 and 27 (FIGS. 7, 8) |
| 30 | retaining means for 21 on 12 (FIG. 1) |
| 31 | joint fitting between 12, 11 (FIG. 3) |
| 32 | joint axis of 31 |
| 33 | handle for 31 |
| 34 | panel package consisting of 26, 27 in the folded position (FIG. 8) |
| 35 | latching means between 21 and 28 (FIG. 4) |
| 36 | bottom surface of 26 (FIG. 7) |
| 37 | bottom surface of 27 (FIG. 7) |
| 38 | side area of 21 (FIG. 6) |
| 39 | tilt angle of 12 or of 12, 21 (FIG. 3) |
| 40 | single large storage space |
| 41 | upper level of 40 |
| 42 | lower level of 40 |
| 43 | depth of well |
| 44 | maximum load height |
| 45 | single large cargo surface (FIG. 4) |
| 46 | small fold angle of 21 (FIG. 2) |
| 47 | large fold angle of 21 (FIG. 4) |
| 48 | honeycomb structure of 52 (FIG. 6) |
| 49 | corrugated intermediate layer of 51 (FIG. 6) |
| 50 | laminate for 21 (FIG. 6) |
| 51 | uppermost layer of 25 (FIG. 6) |
| 52 | support layer (FIG. 6) |
| 53 | upholstery layer (FIG. 6) |
| 54 | decorative layer (FIG. 6) |
| 55 | upper panel of 51 (FIG. 6) |
| 56 | lower panel of 51 (FIG. 6) |

What is claimed is:

1. Device for dividing a single large storage space (40) behind a seat in a vehicle, the seat (10) consists of a flat seat part (11) and a backrest (12), which is connected to the flat seat part (11) by a joint axis (32);

a cover panel (21), which has a horizontal hinge (22) alone one edge;

the cover panel (21) is attached by the hinge (22) to a rear surface (19) of the seat (10) and forms a preassembled structural unit (20) together with the seat (10);

the hinge allows the cover panel to fold up and down between a storage (down) position and a non-storage (up), the hinge (22) of the cover panel (21) is attached to a bottom edge of the backrest (12) in the region of the joint axis (32) of the seat (10);

stationary support means, which position the cover panel in its storage down, position relative to the backrest (12) a defined vertical distance from a floor of the vehicle, the support means being fixed support surfaces (28) on an inner wall of the vehicle, the support surfaces (28) supporting the cover panel (21) in the storage position;

the cover panel (21) having a utility surface (25) on which a load can be placed in the vehicle when the cover panel (21) is in the storage position;

when the cover panel (21) is in the non-storage position the utility surface (25) of the cover panel (21) is directed toward the rear surface (19) of the backrest (12) so as to be concealed, and when the cover panel is in the storage position the utility surface (25) of the cover panel (21) as well as the rear surface (19) of the backrest (12) are exposed and the single large storage space (40) is divided into two levels, one above the other.

2. Device according to claim 1, wherein the utility surface (25), which is invisible in the non-storage position (21.1) but which supports the cargo when in storage position (21.2), is designed differently from a decorative surface (24) of the cover panel (21), which decorative surface is visible in the non-storage position (21.1) of the panel, where the utility surface (25) is mechanically strong, and the decorative surface (24) matches the style of its surroundings.

3. Device according to claim 1, wherein the cover panel (21) is made up of multiple layers, and in that these layers (51–54) are assembled to form a laminate (50), where, when the cover panel (21) is in the storage position (21.2), the utility surface (25) forms an uppermost layer (51) then a dimensionally stable support layer (52), and where a decorative surface (24) is the lowermost, decorative layer (54).

4. Device according to claim 3, wherein an upholstery layer (53), which has acoustic damping properties, is provided between the support layer (52) and the decorative layer (54).

5. Device according to claim 3, wherein the utility surface (25) of the cover panel (21) is provided with functional parts.

6. Device according to claim 5, wherein the functional parts are one of friction strips, tie-down rings and handles.

7. Device according to claim 3, wherein the support layer (52) has a honeycomb structure (48).

8. Device according to claim 1, wherein the storage position (21.2) of the cover panel (21) is held in place by latching means (35) in the interior of the vehicle.

9. Device according to claim 1, wherein the backrest (12) can pivot with respect to the flat seat part (11) between a seating function where the backrest (12) is at an angle to the seat part (11) and a loading function, in which the backrest (12) is supported against the seating surface (13) of the flat seat part (11) by the support surface (14) of the backrest (12), in this loading function;

the utility surface (25) of the cover panel (21) and the rear surface (19) of the folded-forward backrest (12) form a single, large, essentially continuous storage surface (45).

10. Device according to claim 1, wherein the cover panel (21) is configured to correspond in at least one of the non-storage position (21.1) and the storage position (21.2) to at least one of 3-dimensional spaces present in the seat area and a shape of the car body in the storage space (40).

11. Device according to claim 1, wherein:

the cover panel (21') is made up of at least two sub-panels (26, 27) arranged in sequence in the longitudinal direction of the vehicle; in that the sub-panels (26, 27) are connected to each other by an auxiliary hinge (29).

12. Device according to claim 11, wherein the manner in which the cover panel (21') is divided into sub-panels conforms to the way in which the seat (10') is divided in the lateral direction of the vehicle.

13. Device according to claim 1, wherein at least one additional auxiliary panel is provided, which is underneath the cover panel (21) when the cover panel in its storage position (21.2); and in that the auxiliary panel and the cover panel (21) cooperate to divide the single large cargo space (40) of the vehicle into several sub-spaces.

* * * * *